March 12, 1940. J. S. LOSEE Re. 21,393

ELECTRIC WATER HEATER

Original Filed Aug. 5, 1937 2 Sheets-Sheet 1

INVENTOR
JOSEPH S. LOSEE
By A.S. Kroh
Attorney

March 12, 1940. J. S. LOSEE Re. 21,393

ELECTRIC WATER HEATER

Original Filed Aug. 5, 1937 2 Sheets-Sheet 2

INVENTOR
JOSEPH S. LOSEE
By A. S. Krob
Attorney

Reissued Mar. 12, 1940

Re. 21,393

UNITED STATES PATENT OFFICE 21,393

ELECTRIC WATER HEATER

Joseph S. Losee, Hebron, Ill., assignor to Losee Products Company, Hebron, Ill., a company of Illinois Original No. 2,146,022, dated February 7, 1939, Serial No. 157,474, August 5, 1937. Application for reissue October 9, 1939, Serial No. 298,712

20 Claims. (Cl. 219—39)

Figure 1:
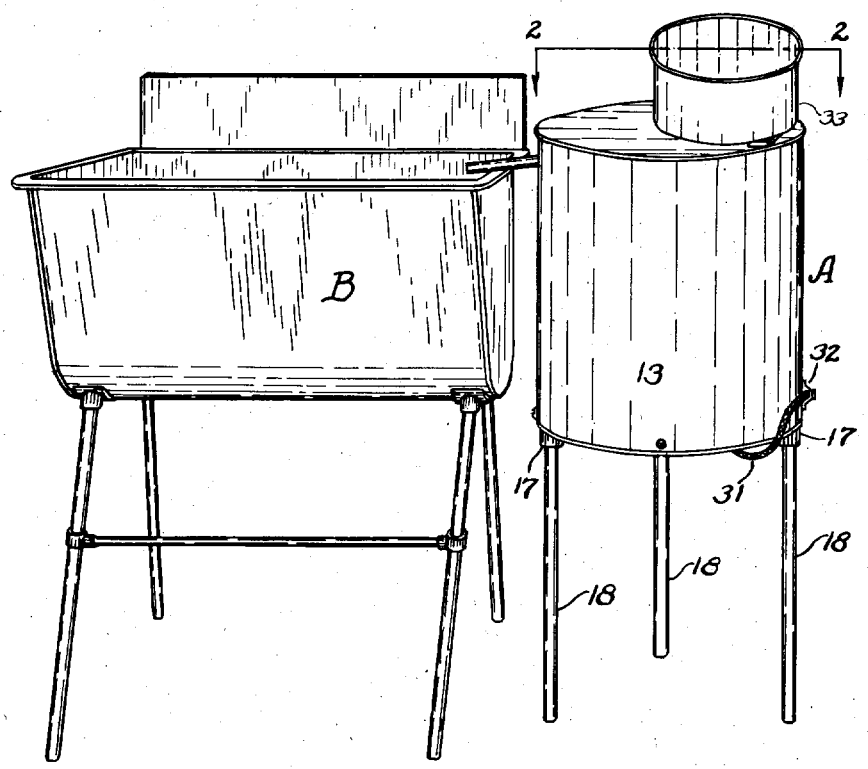

My present invention relates in general to water heaters, and more particularly to electric heaters wherein the heated water is maintained at temperatures within predetermined limits.

An important object of the present invention is to provide economical means for maintaining, in a suitable reservoir, a supply of hot water available for use at all times; a further object being to provide, in said heater, means for preventing heat loss through supply and delivery pipes communicating with said reservoir.

A further object is to provide a simplified displacement heater adapted to discharge hot water from the reservoir through the delivery pipe upon the introduction of cold water to said reservoir for heating, the cold water so introduced acting to displace an equivalent quantity of hot water from the reservoir.

A further object is to provide a heater of the character mentioned having means for delivering cold water by gravity to the reservoir for heating; a further object being to provide funnel means in position above and draining into the reservoir and into which funnel means cold water may be poured for drainage, thence by gravity into the reservoir for heating; a still further object being to arrange the hot water delivery pipe in position at or adjacent the top of the reservoir so that heated water may be discharged at an appreciable elevation for delivery into receptacles of substantial height whereby the cold water receiving funnel, in the assembly, may be positioned only sufficiently above the hot water discharge pipe to enable hot water to be delivered from the reservoir by cold water displacement therein, thus permitting the arrangement of the funnel at an elevation with respect to the unit permitting cold water easily to be poured into the funnel without requiring undue lifting of the cold water.

A further object of the present invention is to provide for convenient access to a heating element and a control thermostat used in heating and maintaining the temperature of water in the reservoir whereby said thermostat and heating element may be conveniently inspected, removed, and replaced.

Another object of the invention is to arrange the heating element in the bottom of the reservoir whereby, upon removal of the heating element, the reservoir may be drained.

Another important object is to construct and arrange the heater so that the reservoir cannot be accidentally or carelessly drained of water while the heater unit is in place.

A further object of the present invention is to minimize loss of heat from the reservoir by conduction and radiation.

These and other numerous objects, advantages, and inherent functions of the invention will become apparent as the same is more fully understood from the following description, which, taken in connection with the accompanying drawings, discloses a preferred embodiment of the invention.

Figure 2:
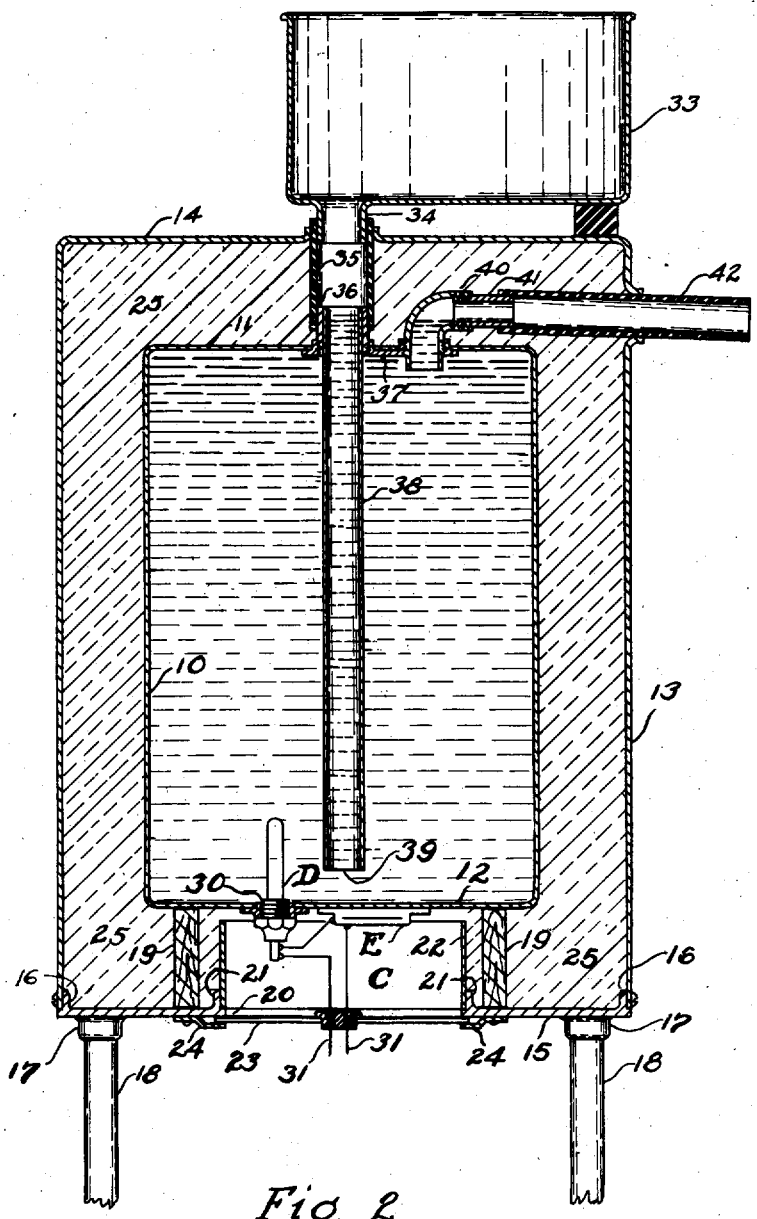

Referring to the drawings:

Figure 1 is a perspective view of a heater unit embodying my present invention in association with a conventional washtub in position to receive hot water discharged from the heater; and Figure 2 is a vertical section through the heater unit taken substantially along the line 2—2 in Figure 1.

To illustrate my invention I have shown on the drawings a heater unit A in association with a receiver B, which forms no part of this invention but which is shown for the purpose of illustrating a valuable feature of the invention, consisting in the arrangement whereby hot water is discharged from the heater at an appreciable elevation for delivery into receivers of substantial height, such as the conventional washtub shown.

The water heating unit A comprises a reservoir or heating tank having preferably a cylindrical side wall 10, a top wall or head 11, and a bottom wall or head 12. This heating tank is enclosed within a casing, as clearly shown in Figure 2 of the drawings, having preferably a cylindrical side wall 13, a top head 14, and a bottom head 15. The bottom wall or head 15 of the casing is preferably formed as an element separate from the side walls 13, and is provided with a peripheral flange 16 adapted to receive the bottom edge of the casing wall 13, which is secured to said flange in any suitable or preferred fashion. The member 15 may be provided with sockets 17 for the reception of supporting legs 18 whereby the casing and the heating tank therein may be supported at a desired elevation from the floor or other foundation on which the unit may be set for use. The water heating tank is preferably supported on the member 15 by means of blocks or strips 19 which preferably comprise wooden elements.

The member 15 is formed with a central opening 20 defined by an annular flange 21 which serves to position and support a sleeve member 22 extending from the opening 20 upwardly of the member 15 toward the bottom of the heating tank, said sleeve 22 terminating short of the bottom 12 of the heating tank to define a chamber C, in which at least portions of said bottom wall 12 are exposed.

I provide a removable lid or cover 23 for closing the opening 20 in the member 15, and suitable means 24, preferably comprising clips, on the member 15 for holding the lid in closed position.

Insulating material 25 is packed into the space between the top heads and side walls of the heating tank and casing and between the member 15 and the wall 12 of the heating tank outwardly of said chamber C, defined by the sleeve member 22. The chamber C likewise may be packed with insulating material so that the heating tank is completely insulated against heat transfer by conduction therefrom to the outer casing.

Suitable conduit means is provided for introducing water for heating, preferably at the top of the unit, and delivering the same into the tank, preferably at the bottom thereof. Conduit means is also provided for discharging hot water preferably from the top of the heating tank.

A heating element D, preferably comprising an electrical emersion heater preferably supported on a screw-threaded, plug-forming portion, is mounted on the bottom wall 12 of the heating tank in position extending within said tank. Said element thus may be mounted in an opening forming a drain in said bottom wall defined by a flange 30 threaded for the reception of the threaded heater supporting portion whereby said threaded portion forms a closure for said opening. When the heater is in place, water introduced to the heating tank will be retained therein against escape through said drain opening, and it is thus apparent that the tank, after being initially filled and so long as the heater is in place, will remain charged with water, since the outlet conduit arrangement at the top of the tank is arranged to trap a body of water in the tank at all times. When the heater element, however, is removed, water may be drained from said heating tank through said opening.

Thermostatic means E also is provided in heat exchange relationship with the heating tank, said thermostatic means preferably comprising a switch member secured on the bottom wall 12 of the heating tank and electrically connected with said heater and suitable conductors 31 which preferably extend through an insulated opening formed in the cover 23, said conductors preferably terminating in an electrical connector 32 to facilitate electrical connection with a source of electrical power for energizing the heater.

The conduit means provided for introducing cold water to the heating tank preferably extends through the outer casing, the insulation 25, and into the heating tank, and terminates preferably adjacent the bottom wall 12 of the heating chamber in the vicinity of the thermostatic control means E. The conduit means preferably extends through the top wall 14 of the casing and the top head of the heating tank, and the same, as shown, may comprise a pipe 38 extending in the heating tank and held at one end in a metal nipple 36 which is screw-threaded into a flange member 37 fastened in the head 11 of the heating tank so that one end of said pipe 38 opens outwardly of the heating tank and is connected through the top wall 14 of the enclosing casing with a source of supply of cold water, heat insulating means 35 being provided to insulate the pipe 38 against a transfer of heat therefrom to said outer casing.

As shown in the accompanying drawings, the insulating means 35 may comprise a sleeve-like member of rubber-like material interposed between the pipe 38 and the opening in the outer casing through which the cold water delivery conduit extends. Furthermore, the sleeve-like heat insulating member 35 may form a part of said cold water conduit and serve to interconnect the pipe 38 with the cold water supply, which, in the illustrated embodiment, comprises a tank 33 supported at the top of the casing and having an outlet pipe 34 connected through the insulating member 35 with the pipe 38.

By pouring cold water into the supply tank 33, cold water will be delivered by gravity through the inlet conduit into the heating tank, the inlet conduit being preferably, though not essentially, arranged to introduce the cold water at the bottom of the heating tank directly in heat exchange relationship with respect to the control thermostat E.

I preferably arrange to discharge hot water from the heating tank through an outlet extending from the top of the heating tank laterally through the insulation 25 and the side wall of the outer casing, so that hot water will be discharged by displacement upon the introduction of cold water into the heating tank, said hot water outlet being arranged to deliver hot water substantially at the top of the unit in order to permit the same to be caught in receptacles of appreciable height such as the washtub B; and it will be noted that the cold water supply tank 33 is at an elevation sufficiently above the hot water discharge outlet to insure delivery of hot water by displacement so that cold water may easily be poured into the supply tank 33 without requiring undue lifting of cold water above the hot water outlet.

The hot water outlet comprises a conduit connected at one end in the upper portions of the heating tank and extending thence through the insulation 25 and through the outer casing, the conduit being preferably connected in the top wall 11 of the heating tank and extending through an opening in the side wall 13 of the casing. I provide means for insulating the heating tank against heat loss to the outer casing by conduction along the outlet conduit, said insulating means preferably comprising an annular or sleeve-like member 42 of rubber-like material extending in the opening in the wall 13 through which said outlet conduit projects. As shown in the drawings, the outlet conduit comprises an elbow 40 of metallic material, one end of which is connected in an opening defined in the top wall 11 of the heating tank. The other end of the elbow is connected with a pipe 41 forming a part of the outlet conduit, which pipe is insulated by the member 42 against heat transfer therefrom to the walls of the outer casing, the insulating means 42 in the illustrated embodiment comprising a sleeve-like hose of rubber-like material connected at one end on the pipe 41 within the enclosing casing, and projecting at the other end outwardly of said casing.

To attach the elbow 40 in the top wall 11, the same is preferably screw-threaded in the member 37 in which the inlet conduit 38 is likewise mounted, the end of the elbow 37 preferably extending a short distance into the tank below the member 37. The outlet conduit is positioned preferably at a slight downwardly extending angle to thereby prevent water from collecting in the conduit. The inlet and outlet conduits are each closely embraced by housing flanges, as shown at the places where the same extend through the walls of the housing 14.

When the tank, is charged with water, the maximum liquid level within the tank ordinarily is not higher than the lower end of the elbow 40. After such level is reached, in charging the tank, water will rise in the inlet conduit to form a head. So long as such head is above the level of the bottom of the opening in the outlet conduit 41, water will be forced out of the tank through the outlet conduit, and this discharge will continue until a condition substantially as shown in Figure 2 of the drawings is reached. It is possible, of course, that a siphon action may be set up and cause water to flow out of the discharge pipe and thus draw the liquid in the tube 38, somewhat below the level shown in Figure 2, before the siphon is broken. However, as soon as the siphon is broken, the liquid will tend to return at least to levels substantially as shown in Figure 2, so that the heating tank may be sealed against the escape of free vapor which may gather in the top of the tank 10 above the liquid level therein.

It will thus be seen that I have provided a device in which the transfer of heat outwardly of the tank 10 to the housing 14 or the charging tank 33, or to the exterior of the unit, is substantially prevented, heat loss prevention being accomplished not only by insulating the tank but by arranging the inlet and outlet conduits with heat insulating means 35 and 42 adapted to prevent heat conduction from the tank 10 to the housing 14 through said inlet and discharge conduits. In this connection it will be noted that the sleeves 35 and 42 which provide insulation against heat conduction from the tank 10 to the tank 14 do not normally contain water which might serve as a heat conducting path.

While the device of my present invention is well adapted for domestic use, as for example in kitchens, bathrooms, and basements, the heater is particularly well suited for dairy farm service, as for example in farm milk houses where an abundant supply of hot water is not only a convenience but a necessity in maintaining high standards of cleanliness. The heat saving features of my invention render the device particularly efficient for use in milk houses and other locations where the circumambient atmosphere may remain at low temperature, which, of course, is the normal wintertime condition in farm milk houses. Under such operating conditions, the device of my present invention affords means for maintaining at all times a supply of hot water at a minimum cost, due to the substantial prevention of heat loss from the tank 10 to the housing 14 and the circumambient atmosphere.

The device of my present invention is also designed to facilitate use. In order to obtain a desired quantity of hot water, it is merely necessary to pour an equivalent quantity of cold water into the charging tank 33, whereupon substantially the required amount of hot water will be discharged through the outlet conduit. The amount of water discharged, of course, is not necessarily the exact same volume poured into the tank 33, but the quantity discharged will be substantially equivalent to the amount of cold water charged into the heater, the discrepancy, if any, being attributable to such siphonic action as may be set up at the outlet elbow 40, or the expansion of water when heated, or other negligible effects.

The cold water introduced to the tank through the pipe 38 is directed to and will accumulate at the bottom of the tank, the hot water being always drained from the top of the tank. As soon as cold water is added, the switch E will be operated to energize the heating element D in order to bring the cold water in the tank up to the desired temperature. The thermostat, of course, may be set to energize the heater at any desired temperature, and to deenergize the heater at a higher temperature as soon as the water in the tank shall have reached such higher temperature.

The heat conserving features of my present invention make it possible thus to set the lower or heat starting temperature of the thermostat substantially lower than the maximum or heater cut-out temperature, since the device of my present invention will retain a volume of water at a desired temperature for many hours without warranting the automatic reenergizing of the heater in order to maintain the temperature; and in order to prevent frequent siphoning of the heater, I prefer to set the thermostat with a substantial difference between the heater-starting and cut-off temperature limits, although, of course, the thermostat may be adjusted between any desired limits.

It is thought that the invention and its numerous attendant advantages will be fully understood from the foregoing description, and it is obvious that numerous changes may be made in the form, construction, and arrangement of the several parts without departing from the spirit and scope of the invention, nor sacrificing its attendant advantages, the form herein disclosed being merely for the purpose of demonstrating the invention.

The invention is hereby claimed as follows:

1. A device of the class described, comprising a water tank having heating means at the bottom thereof, a normally empty supply tank secured to the top of said water tank and having a drain tube extending through the top of and to near the bottom of said tank, a normally empty outlet pipe having a connection into the top of said tank, whereby water poured into said supply tank will cause a corresponding quantity to be displaced and escape through said outlet pipe, said drain tube and outlet pipe being adapted to act as a seal to prevent the escape of freed vapor.

2. A device of the class described, comprising a water tank having heating means at the bottom thereof, a supply tank positioned above and spaced from the top of said water tank and having an open drain tube extending through the top of and to near the bottom of said water tank, a normally empty outlet pipe having a connection into the top of said water tank, whereby water poured into said supply tank is free to flow into said water tank and cause a corresponding quantity to be displaced and escape through said outlet pipe, said heating means comprising an electric heating element extending into the bottom of said water tank and having an operatively connected thermostat controlled switch, whereby the water in said water tank will be heated and held at a temperature within predetermined limits, the portion of said drain tube between said tanks being made of a heat resisting material.

3. A device of the class described, comprising an inclosure having therein a closed water tank of a size providing an insulating space between the tank and enclosure, a supply tank positioned above said inclosure having a normally empty tube extending through the upper ends of said inclosure and water tank and extending to near the bottom of said water tank, a normally empty open water outlet connection in the top of said tank and extending transversely through said insulating space, an electric heating element extending into said water tank near the bottom thereof and having an operatively connected thermally controlled switch in heat exchange contact with said tank whereby the water temperature in said tank will be maintained, and whereby a quantity of water poured into said supply tank will cause a corresponding quantity to escape from said water tank through said outlet tube.

4. A device of the class described, comprising an inclosure having therein a closed water tank of a size providing, between the tank and enclosure, an insulating space filled with an insulating material, a supply tank positioned above said device having a drain tube extending through the upper heads of said inclosure and water tank and to near the bottom of said water tank, an open water outlet connection in the top of said water tank and extending through said insulating space, an electric heating element in heat exchange contact with the water in said tank near the bottom thereof and having an operatively connected thermally controlled switch whereby the water temperature in said tank will be maintained, and whereby a quantity of water poured into said supply tank will cause a corresponding quantity to escape through said outlet tube, said drain tube and outlet connection being positioned to thereby remain normally empty in the portion passing through said insulating material.

5. A device of the class described, comprising an enclosure having therein a closed water tank of a size providing an insulating space between the tank and enclosure, a supply tank positioned above said enclosure having a drain tube extending through the wall of said enclosure, through said insulating space and into said water tank terminating near the bottom thereof, an outlet connection at the top of said water tank extending through said insulating space to the exterior, the portion of said outlet connection extending through said insulating space and to the end of the tube being adapted to remain normally empty and to also cause said supply tank and its drain tube to remain normally empty to a point adjacent the top of said water tank, whereby a quantity of water poured into said supply tank will flow into said water tank and cause a corresponding quantity to escape through said outlet tube, an electric heating element positioned at or near the bottom of said tank and adapted to heat the water therein and being operatively connected to a thermally controlled switch, said switch being in heat exchange relation with said tank and having means whereby the water in said tank may be maintained at temperatures within predetermined limits.

6. A device of the class described, comprising an enclosure having therein a normally full liquid tank of a size providing, between the tank and enclosure, an insulating space filled with a heat insulating material, a supply tank positioned above said device having a drain tube extending through the tops of said enclosure and water tank and to near the bottom of said tank, an open water outlet tube in the top of said liquid tank and extending through said insulating space, an electric heating element extending into said tank near the bottom thereof and having an operatively connected thermally controlled switch in heat exchange contact with said tank whereby the water temperature in said tank will be maintained, and whereby a quantity of water poured into said supply tank will cause a corresponding quantity to escape from said liquid tank through said outlet tube.

7. A device of the class described, comprising a housing having therein a closed tank of a size providing, between the tank and housing, a space filled with insulating material, means in the bottom of said tank for heating liquid therein, a vertically positioned supply tube extending through said insulating material and the tops of said housing and tank to near the bottom of said tank, an open liquid outlet tube connection in the top of said tank and extending to the exterior of said housing, the part of said supply and outlet tube extending through said insulating material comprising heat insulating material to thereby prevent heat transfer from said tank to said housing or to the exterior, said supply and outlet tubes being positioned to thereby remain normally empty in the portion thereof which is positioned in said insulated space.

8. A device of the class described, comprising a housing having therein a closed water tank leaving a space filled with insulating material between the tank and housing, means near the bottom of said tank adapted to heat the water therein, a supply tank positioned above said housing and having an open drain connection through the tops of said housing and water tank and extending downward to near the bottom of said water tank, an open outlet pipe extending from the top of said water tank through said insulating material and housing, whereby when a quantity of water is placed in said supply tank it will flow into said water tank and cause a corresponding quantity to be displaced and escape through said outlet pipe, portions of said outlet connection and drain pipe in said space being made from heat insulating material, said portions being positioned whereby they will remain normally clear of liquid.

9. A device of the class described, comprising a housing having therein a closed liquid tank of a size providing, between the tank and housing, a space filled with insulating material, means at the bottom of said tank for heating the liquid therein, normally open inlet and outlet connections for said tank, at least a portion of said connections extending in said space being made of heat insulating material.

10. A device of the class described, comprising a closed water tank having a heat insulating covering, a relatively small access opening in the bottom of said covering to said tank, means in said opening adapted to extend into the bottom of said tank and heat the liquid therein, an open inlet tube connection in the top of said tank, a normally empty outlet tube in the top of said tank, the portions of said inlet and outlet tubes extending through said insulating covering being made from heat insulating material, said inlet connection having means to conduct the liquid to near the bottom of said tank.

11. A device of the class described, comprising in combination a normally full water tank having a heat insulating container, means adapted to heat the water in the bottom of said tank by means of heat exchange contact therewith, means for delivering water from the top of said tank, a vertically and centrally positioned inlet pipe extended to near the bottom of the tank and protruding through said container, a filler tank having a rotatable drain connection at one side to said protruding end, said filler tank having supporting means spaced from said protruding end, whereby it may be rotated and supported in any desired position around said protruding end.

12. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, and heat insulating means comprising an annular member associated with at least one of said conduits for preventing heat transfer from said tank to said housing by conduction along the conduit.

13. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, and heat insulating means comprising an annular member associated with at least one of said conduits for preventing heat transfer from said tank to said housing by conduction along the conduit, said insulating means extending in an opening of said housing through which said conduit passes.

14. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, and heat insulating means comprising an annular member associated with at least one of said conduits for preventing heat transfer from said tank to said housing by conduction along the conduit, said heat insulating means comprising a sleeve forming a part of said conduit extending between said tank and housing.

15. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, and heat insulating means comprising an annular member associated with at least one of said conduits for preventing heat transfer from said tank to said housing by conduction along the conduit, said heat insulating means comprising a sleeve forming a part of said conduit extending in an opening in said housing and having a portion projecting outwardly of said housing.

16. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, heat insulating means comprising an annular member associated with at least one of said conduits for preventing heat transfer from said tank to said housing by conduction along the conduit, and means forming a supply receiver at the top of said housing and connected with said inlet conduit to deliver liquid by gravity from the supply receiver into said tank.

17. A device of the class described comprising a housing having therein a liquid tank, insulating material within the housing and around the tank, means for heating liquid in the tank, an inlet conduit opening outwardly of said housing and opening into the tank, an outlet conduit connected to the tank and extending thence through and opening outwardly of said housing, and heat insulating means comprising an annular member associated with at least one of said conduits for preventing heat transfer from said tank to said housing by conduction along the conduit, said outlet conduit being connected in the tank to receive liquid from the upper portions of the tank and said outlet conduit extending outwardly of the housing at an elevation substantially opposite the top of the tank whereby liquid discharged through said outlet may be delivered at an elevation substantially above the bottom of the device to facilitate catchment of the discharge liquid in receptacles of appreciable height.

18. A device of the class described, comprising a housing having therein a liquid tank, insulating material within the housing and around the tank, means for heating liquid in the tank, an inlet conduit opening outwardly of said housing and opening into the tank, an outlet conduit connected to the tank and extending thence through an opening outwardly of said housing, heat insulating means comprising an annular member associated with at least one of said conduits for preventing heat transfer from said tank to said housing by conduction along the conduit, means forming a supply receiver at the top of said housing and connected with said inlet conduit to deliver liquid by gravity from the supply receiver into said tank, said outlet conduit being connected in the tank to receive liquid from the upper portions of the tank and said outlet conduit extending outwardly of the housing at an elevation substantially opposite the top of the tank whereby liquid discharged through said outlet may be delivered at an elevation substantially above the bottom of the device to facilitate catchment of the discharged liquid in receptacles of appreciable height, and wherein the supply receiver is at a minimum elevation above said discharge outlet to allow cold liquid easily to be poured into the supply receiver without undue lifting.

19. A liquid heater comprising a tank, jacketing means for said tank comprising a housing surrounding the tank and heat insulating means within the housing around the tank, an electric heater operatively associated with the tank to heat liquid therein and including electrical connections forming a heater energizing circuit, a thermostat operatively associated with said tank in heat exchange relationship with liquid therein, a switch controlled by said thermostat and controllingly associated with said heater energizing circuit, means forming an outlet conduit opening outwardly of the jacketing means substantially opposite the top of the tank, said conduit being connected to receive liquid at the upper portions of said tank, means forming a supply receiver at the top of the housing, means forming an inlet conduit connecting said supply receiver with said tank to deliver liquid by gravity from the receiver to said tank whereby to displace an equivalent quantity of liquid from said tank and discharge the same through said outlet conduit, and heat insulating means comprising annular members of rubberlike material connected with at least one of said conduits and in operative relationship to check heat flow from the tank to the housing along said conduit.

20. A liquid heater comprising a tank having an aperture in its bottom, removable closure means for sealing said aperture, jacketing means for said tank comprising a housing surrounding said tank, means supporting said tank in said housing, heat insulating material surrounding said tank within said housing, said jacketing means having an opening therein affording access to the bottom of said tank and removable cover means for closing said opening and heat insulating the bottom of said tank, a heater on said closure means and extending within said tank, said heater including electrical connections extending through said closure means and outwardly of said tank to form an energizing circuit for said heater, a thermostat on the bottom of said tank and in heat exchange relationship with liquid therein, a switch controlled by said thermostat and controllingly associated with said heater energizing circuit, conduit means forming an inlet through said jacketing means into said tank and comprising an inlet pipe opening outwardly of and sealed in the top of the tank and having an end disposed within the tank adjacent the bottom thereof in position to direct liquid, introduced to the conduit means from outside the housing, immediately in heat exchange relationship with respect to said thermostat, conduit means forming an outlet extending through the jacketing means substantially opposite the top of the tank and comprising an outlet pipe extending through and sealed in the upper portions of said tank, and heat insulating means comprising an annular member of rubber-like material engaging at least one of said pipes in position with respect to said housing to prevent heat transfer from the tank to the housing by conduction along the conduit means.

JOSEPH S. LOSEE.